(12) United States Patent
Bossecker et al.

(10) Patent No.: US 12,334,786 B2
(45) Date of Patent: Jun. 17, 2025

(54) DISC ROTOR MACHINE WITH STATOR HAVING CORE SEGENTS, WITH ROTOR DISC WITH COOLING DEVICE

(71) Applicant: Schaeffler Technologies AG & Co. KG, Herzogenaurach (DE)

(72) Inventors: Maximilian Bossecker, Hügelsheim (DE); Holger Witt, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 573 days.

(21) Appl. No.: 17/632,249

(22) PCT Filed: Jul. 21, 2020

(86) PCT No.: PCT/DE2020/100634
§ 371 (c)(1),
(2) Date: Feb. 2, 2022

(87) PCT Pub. No.: WO2021/032236
PCT Pub. Date: Feb. 25, 2021

(65) Prior Publication Data
US 2022/0278579 A1 Sep. 1, 2022

(30) Foreign Application Priority Data
Aug. 20, 2019 (DE) ...................... 10 2019 122 314.8

(51) Int. Cl.
*H02K 3/24* (2006.01)
*H02K 1/20* (2006.01)
(Continued)

(52) U.S. Cl.
CPC ................. *H02K 3/24* (2013.01); *H02K 1/20* (2013.01); *H02K 1/2798* (2022.01); *H02K 3/28* (2013.01); *H02K 21/24* (2013.01)

(58) Field of Classification Search
CPC ........ H02K 3/26; H02K 2203/03; H02K 3/28; H02K 3/46; H02K 1/182; H02K 1/2793;
(Continued)

(56) References Cited

U.S. PATENT DOCUMENTS 6,304,011 B1 10/2001 Pullen
RE37,844 E * 9/2002 Pullen ...................... H02K 3/47
310/58
(Continued)

FOREIGN PATENT DOCUMENTS

CN 102227861 A 10/2011
CN 114365387 A 4/2022
(Continued)

*Primary Examiner* — Maged M Almawri (57) ABSTRACT

A disc rotor machine for a motor vehicle drive is disclosed that includes a disc-shaped stator. The stator has a plurality of core segments-, which are distributed in a circumferential direction and are rigidly connected to one another by means of at least one retaining ring, and a plurality of coil windings each extending around a core segment. The disc rotor machine also comprises a rotor which is mounted rotatably relative to the stator, the rotor having a first rotor disc arranged adjacent to the stator towards a first axial side and a second rotor disc arranged adjacent to the stator towards a second axial side opposite the first axial side, which rotor discs can be driven by a plurality of coils of the stator which are distributed in a circumferential direction and include the core segments and coil windings. The disc rotor machine further comprises a cooling device which cools the coils during operation, the stator having a carrier wheel which accommodates the coil windings and is connected to the at least one retaining ring, the carrier wheel forming a cooling channel portion of the cooling device that directly accommodates at least one of the coil windings.

9 Claims, 13 Drawing Sheets

(51) Int. Cl.
*H02K 1/2798* (2022.01)
*H02K 3/28* (2006.01)
*H02K 21/24* (2006.01)

(58) Field of Classification Search
CPC .......... H02K 21/24; H02K 3/522; H02K 3/47;
H02K 3/24; H02K 1/20; H02K 1/2798;
B60L 58/21; B60L 2240/421; Y02T
10/641; Y02T 10/645; Y02T 10/7005;
Y02T 10/7061; Y02T 10/72; Y02T
10/7275
USPC ....... 310/49.22, 49.23, 49.32, DIG. 6, 12.21,
310/12.22, 12.23, 12.01–12.33, 59;
360/99.02, 99.23
See application file for complete search history.

(56) References Cited

U.S. PATENT DOCUMENTS

| | | | | |
|---|---|---|---|---|
| 7,652,406 | B2* | 1/2010 | Kim | H02K 1/18 310/43 |
| 8,013,482 | B2* | 9/2011 | Kurokawa | H02K 9/197 310/58 |
| 9,318,938 | B2* | 4/2016 | Carpenter | H02K 5/203 |
| 9,912,203 | B2* | 3/2018 | Lucchi | H02K 15/022 |
| 10,574,110 | B2* | 2/2020 | Long | H02K 3/28 |
| 2003/0011253 | A1* | 1/2003 | Kalsi | H02K 1/20 310/58 |
| 2005/0035672 | A1* | 2/2005 | Ward | B60L 3/0061 310/156.37 |
| 2007/0040465 | A1* | 2/2007 | Al-khayat | H02K 3/28 310/216.106 |
| 2011/0221287 | A1* | 9/2011 | Lucchi | H02K 3/24 310/54 |
| 2011/0309699 | A1 | 12/2011 | Woolmer | |
| 2011/0309726 | A1* | 12/2011 | Carpenter | H02K 21/24 310/75 R |
| 2013/0147291 | A1* | 6/2013 | Woolmer | H02K 15/02 310/58 |
| 2016/0211718 | A1* | 7/2016 | Lucchi | H02K 9/19 |
| 2018/0212489 | A1* | 7/2018 | Schuler | H02K 1/2798 |
| 2019/0165634 | A1* | 5/2019 | Whaley | H02K 3/50 |
| 2022/0368202 | A1* | 11/2022 | Bossecker | H02K 5/20 |
| 2023/0006485 | A1* | 1/2023 | Witt | H02K 16/02 |
| 2023/0009136 | A1* | 1/2023 | Witt | H02K 1/182 |
| 2023/0327531 | A1* | 10/2023 | Tangudu | H02K 1/27 310/66 |

FOREIGN PATENT DOCUMENTS

| | | |
|---|---|---|
| DE | 102014205034 A1 | 9/2015 |
| DE | 102017215835 A1 | 3/2019 |
| EP | 3485558 A1 | 5/2019 |
| GB | 2482928 A | 2/2012 |
| JP | 2015231291 A | 12/2015 |
| WO | 2008032430 A1 | 3/2008 |
| WO | 2010092400 A2 | 8/2010 |
| WO | 2018015293 A1 | 1/2018 |

* cited by examiner

DISC ROTOR MACHINE WITH STATOR HAVING CORE SEGMENTS, WITH ROTOR DISC WITH COOLING DEVICE

CROSS-REFERENCE TO RELATED APPLICATIONS

This application is the U.S. National Phase of PCT Appln. No. PCT/DE2020/100634 filed Jul. 21, 2020, which claims priority to DE 102019122314.8 filed Aug. 20, 2019, the entire disclosures of which are incorporated by reference herein.

TECHNICAL FIELD

The disclosure relates to a disc rotor machine, preferably designed as an axial flux machine, for a motor vehicle drive, with a stator that is (entirely) disc-shaped, the stator having a plurality of core segments, which are distributed in a circumferential direction and which are rigidly connected to one another by means of at least one retaining ring, and a plurality of coil windings, each extending around a core segment (to form a coil), with a rotor which is mounted rotatably relative to the stator, the rotor having a first rotor disc arranged adjacent to the stator towards the first axial side, and a second rotor disc arranged adjacent to the stator towards a second axial side opposite the first axial side, which rotor discs can be driven by a plurality of coils of the stator which are distributed in a circumferential direction and include the core segments and core windings, and with a cooling device which cools the coils during operation.

BACKGROUND

Disc rotor machines of different designs are already known from the prior art. For example, WO 2018/015293 A1 discloses a stator for an axial flux machine. Here, guide plates are inserted between two coils respectively that are adjacent in the circumferential direction, which are casted together with the coils by means of a casting compound to form a stator disc. A water cooling channel is arranged radially outwards, so that during operation, the coils are passively cooled as a result of the heat dissipation via the guide plates.

However, it has emerged that a disadvantage of this design known from the prior art is that in particular due to the casting compound, sufficient thermal transmission from the coil windings onto the guide plates to form a particularly high-power machine is only limited or is very inefficient. Furthermore, the guide plates are relatively long, and as a result, the heat must be dissipated outwards over a relatively long radial path.

SUMMARY

The object of the present disclosure is thus to provide a disc rotor machine that is equipped to transform the highest possible power density with more powerful cooling.

This is achieved according to the disclosure in that the stator has a carrier wheel that receives the coil windings and is connected to the at least one retaining ring, the carrier wheel forming a cooling channel portion of the cooling device that (directly) accepts at least one of the coil windings.

By providing the cooling channel portion of the cooling device in the carrier wheel and accommodating the coil winding in the cooling channel portion, a holding function is clearly separated from a sealing function/a cooling fluid conducting function. While the at least one retaining ring, together with the core segments, preferably forms a unit which absorbs all drive forces during operation, the carrier wheel is primarily designed to divert the cooling fluid along the coil windings. This makes it possible to form the at least one retaining ring from a stable metal sheet, for example a steel sheet, while the carrier wheel is inexpensively made from a less solid and easier to process material, preferably a plastic material. As a result, the carrier wheel can be easily shaped and a disc rotor machine is made available that is easier to manufacture. At the same time, direct cooling of the coils during operation is made possible.

Further advantageous embodiments are claimed and explained in more detail below.

Accordingly, it is also advantageous if the cooling channel portion is formed directly by an annular partial hollow space of the carrier wheel which receives the at least one coil winding and which encircles in a radial plane arranged perpendicular to a central axis of rotation. As a result, a coolant can be efficiently conducted past the coil winding during operation.

Furthermore, it is advantageous if the partial cavity is also formed by two hollow spokes of the carrier wheel that run radially and are spaced apart in the circumferential direction which hollow spokes (with their inner spaces) are separated/sealed from one another in the circumferential direction in a first radial area (of the carrier wheel) having an inlet and are radially offset from the first radial area, preferably radially inwardly offset, second radial areas are connected to one another in the circumferential direction/merge into one another. This results in a proficient circulation of the coolant when the disc rotor machine is in operation.

An inlet in the first radial area with respect to a first circumferential side of a sealing element separating the two hollow spokes from one another is particularly expediently connected to the cooling channel portion, while a return to a second circumferential side of the sealing element opposite the first circumferential side is connected to the cooling channel portion.

If the cooling channel portion is connected via an axially miming first connection channel to an annular inlet channel enclosed/limited between the carrier wheel and a first retaining ring, the inlet is proficiently integrated between the contour of the retaining ring and the carrier wheel.

Accordingly, it is also expedient if the cooling channel portion is connected via an axially running second connecting channel to an annular return channel enclosed between the carrier wheel and a second retaining ring.

If the cooling channel portion is bounded on its radial outer side by several phase rings each connected to the coil windings and stacked next to one another (in the axial direction), the phase rings are also cooled directly by the cooling device during operation.

In a typical manner, insulation is provided between each two phase rings arranged next to one another, which insulation electrically decouples the phase rings from one another.

If at least one power electronics unit that is partially electrically coupled to the phase rings is arranged/fixed/applied to the phase rings, it is also passively cooled by the phase rings.

For a particularly robust support of the coil windings, it is also advantageous if a coil carrier receiving a coil winding is also fixed in the carrier wheel.

For a particularly robust support, it is advantageous if the coil carrier has a conical contact contour that is received in the carrier wheel. The conical contact contour is preferably moved to an inside of the annularly extending coil support and lies flat against a counter contour of the support wheel in the opposite direction.

In other words, the disclosure thus relates to a special construction and a special cooling concept of a disc rotor (preferably designed as an axial flow machine). A direct cooling of the coil windings/twists by the corresponding cooling medium is achieved by dividing the functions of torque transfer/torque support and coolant sealing into two different components. Accordingly, the structure has a retaining ring that supports the iron cores and the torque, while a carrier disc (carrier wheel) takes up the coil windings. In addition, the carrier disc, together with the phase rings, forms a sealed/closed channel/hollow chamber for the cooling medium.

BRIEF DESCRIPTION OF THE DRAWINGS

The disclosure will now be explained in more detail with reference to figures, in which various exemplary embodiments are also described.

In the figures.

The figures are only schematic in nature and serve only for understanding the disclosure. The same elements are provided with the same reference symbols.

DETAILED DESCRIPTION

Figure 1:
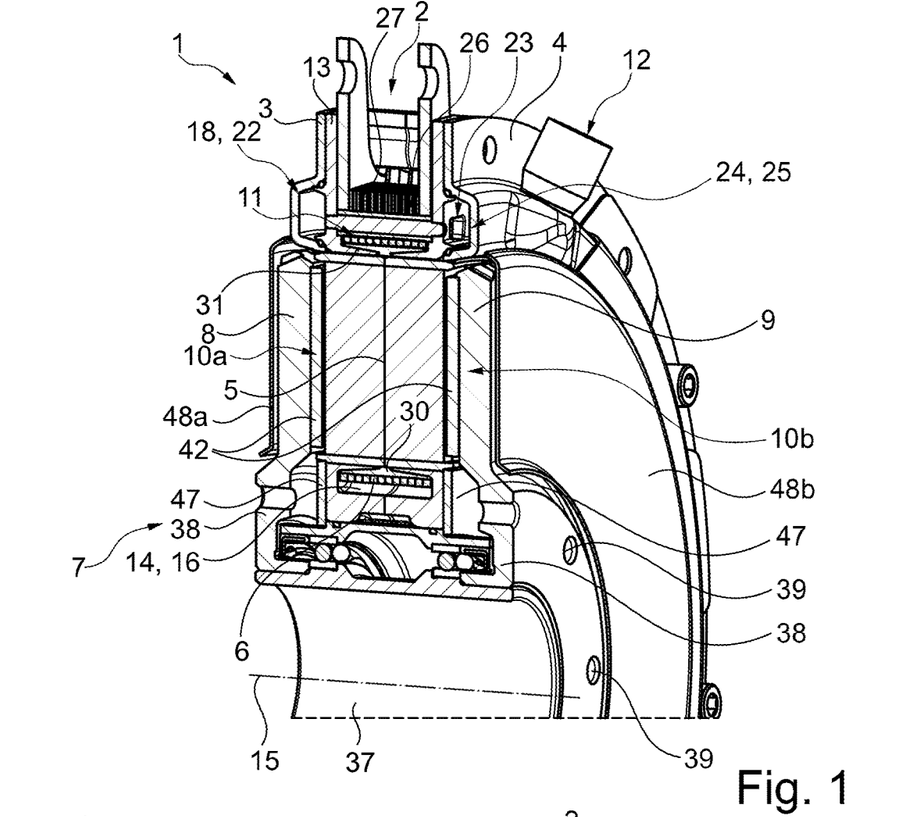
FIG. 1 shows a perspective illustration of a disc rotor machine according to the disclosure, cut in the longitudinal direction, designed according to a first exemplary embodiment.
Figure 2:
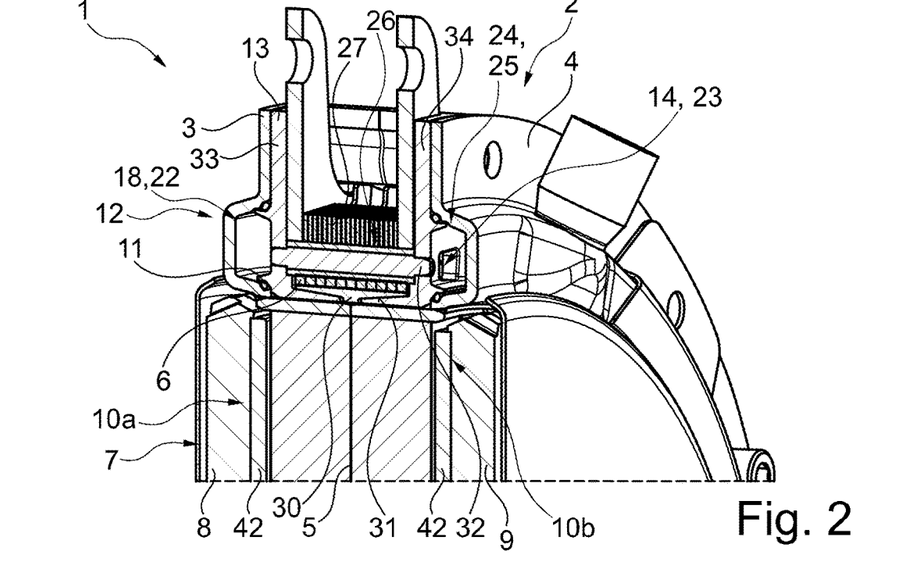
FIG. 2 shows a detailed view of the disc rotor machine according to FIG. 1 cut in the longitudinal direction in a region of an inlet channel and a return channel of a cooling device designed according to the disclosure.
Figure 3:
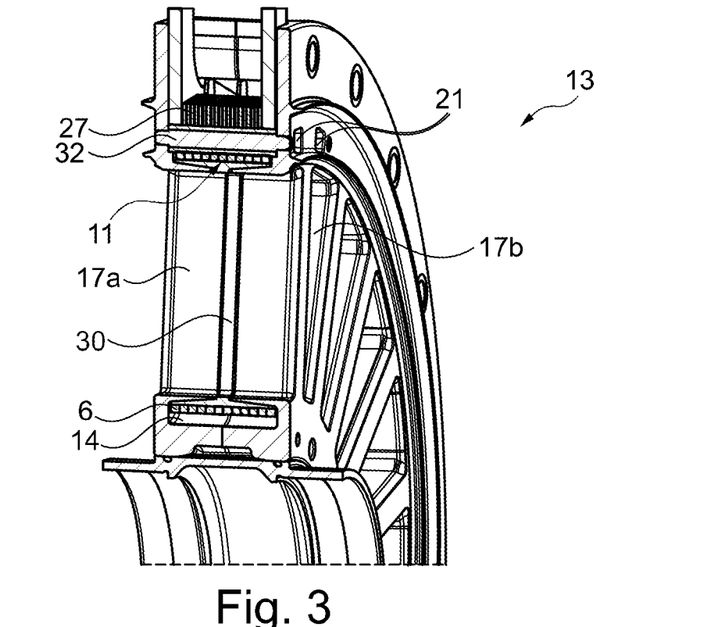
FIG. 3 shows a perspective illustration of a carrier wheel cut in the longitudinal direction, as it is integrated in a stator used in FIG. 1, a coil carrier receiving a coil winding being visible.

The disc rotor machine 1 according to the disclosure according to a preferred first exemplary embodiment is shown in FIGS. 1 and 2 can be seen clearly with regard to its basic structure. The disc rotor machine 1 is implemented as an axial flow machine. The disc rotor machine 1 is preferably used as a drive machine in a motor vehicle drive. The disc rotor machine 1 is equipped with a stator 2 that is entirely disc-shaped. The disc rotor machine 1 also has a rotor 7. The rotor 7 is mounted so as to be rotatable about a central axis of rotation 15 relative to the stator 2.

The axial, radial and circumferential directions used herein relate to a central axis of rotation 15 of the rotor 7 so that, the axial direction r axially is to be understood as a direction along/parallel to the axis of rotation 15, the radial direction/radially is to be understood as a direction perpendicular to the axis of rotation 15, and the circumferential direction is to be understood as a direction tangential to a circular line running concentrically around the axis of rotation 15.

The rotor 7 has a first rotor disc 8 which is arranged towards a first axial side 10*a* of the stator 2 and a second rotor disc 9 which is arranged towards a second axial side 10*b* of the stator 2. In this embodiment, each rotor disc 8, 9 has a flange area 38 in which a plurality of receiving holes 39, which are distributed in the circumferential direction, are implemented for receiving a fastening element, such as a screw.

Figure 23:
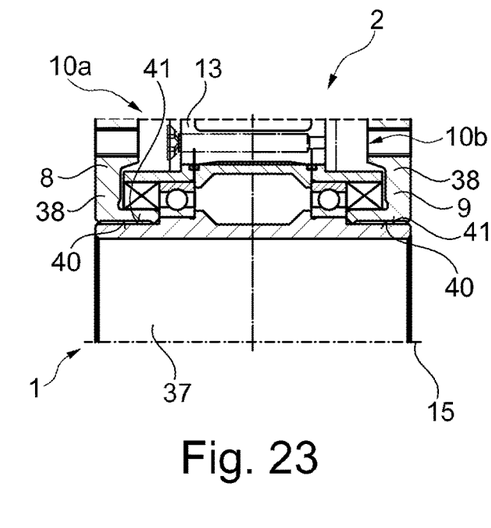
FIG. 23 shows a detailed longitudinal sectional view of a bearing area between a rotor and the stator of the disc rotor machine according to FIG. 1, wherein the coupling of two rotor discs via a coupling shaft can be seen.
Figure 24:
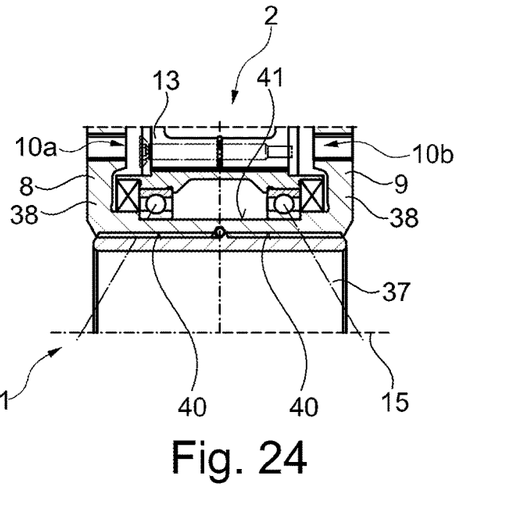
FIG. 24 shows a detailed longitudinal sectional illustration of a disc rotor machine according to the disclosure according to a fourth exemplary embodiment, also from the perspective of its bearing area, the coupling shaft now being designed with a continuous tooth system.
Figure 26:
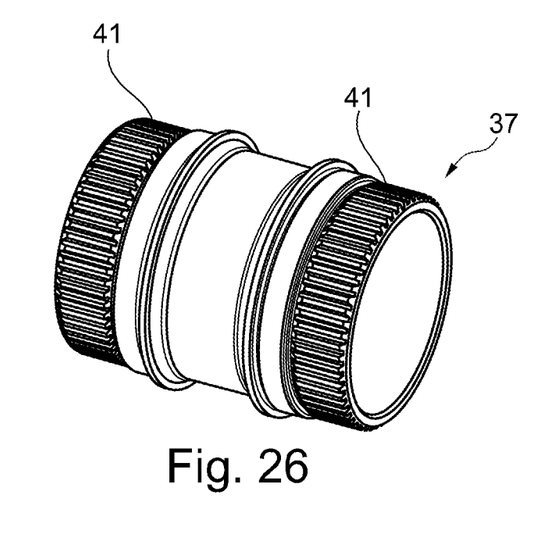
FIG. 26 shows a perspective illustration of the coupling shaft used in the first exemplary embodiment.

The two rotor discs 8, 9 are connected to one another radially within the flange area 38 in a rotationally fixed manner via a coupling shaft 37. In this embodiment, each rotor disc 8, 9 engages with a radial internal toothing 40 in a radial external toothing 41 of the coupling shaft 37. As can be seen in FIGS. 23 and 26, the two areas of the coupling shaft 37 having the external toothings 41 are spatially (axially) separated from one another. According to a further exemplary embodiment, as can be seen in FIG. 24, it is also possible to have the external toothing 41 extend axially continuously. According to further embodiments, it is in principle also conceivable to provide each rotor disc 8, 9 with external teeth and to insert these into internal teeth of the coupling shaft 37.

Figure 25:
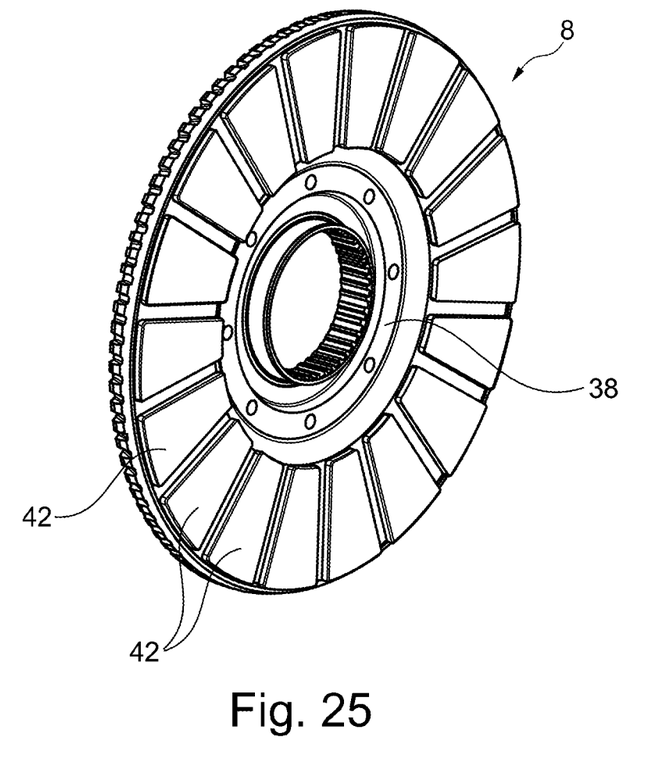
FIG. 25 shows a perspective illustration of a rotor disc used in the first exemplary embodiment.

Each rotor disc 8, 9, of which the first rotor disc 8 is shown as an example in FIG. 25, has a plurality of magnetizable or magnetic plates 42/plate areas distributed in the circumferential direction, which during operation interact with the coils 11 of a coil arrangement 35 of the stator 2, which are described in more detail below.

In FIGS. 3 to 16*b*, the more detailed structure of the stator 2 designed according to the disclosure can also be seen more clearly. In a fully assembled state according to FIGS. 1 and 2, the stator 2 is principally designed as a disc shape. The stator 2 essentially has two main components. A first main component of the stator 2 forms a carrier wheel 13. A second main component of the stator 2 is formed by two retaining rings 3, 4 with several core segments 5 distributed in the circumferential direction, as described in more detail below.

Figure 4:
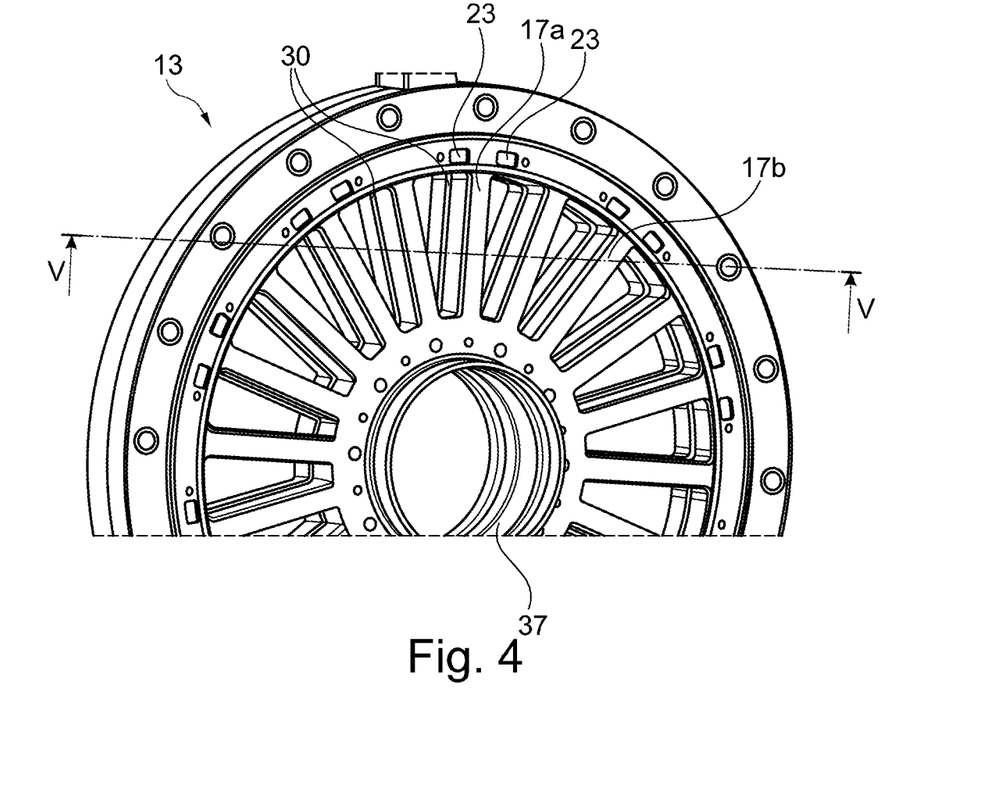
FIG. 4 shows a perspective illustration of the carrier wheel according to FIG. 3 in a full view.
Figure 5:
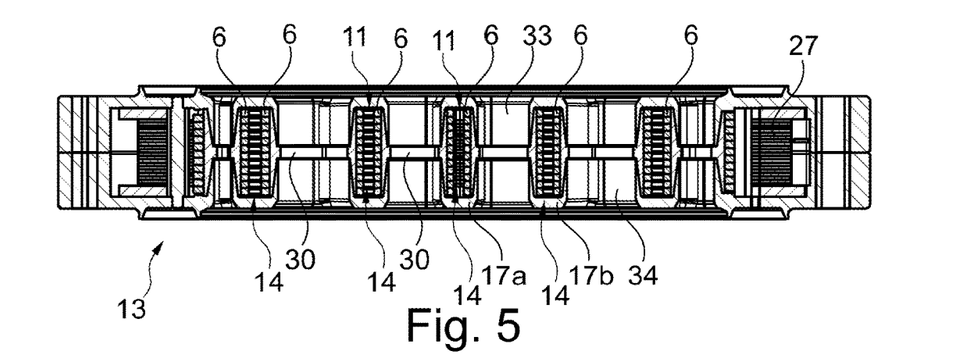
FIG. 5 shows a sectional illustration of the carrier wheel along the section line marked "V-V" in FIG. 4, with several hollow spokes receiving the coil windings in sections and serving as cooling channel portions being cut.
Figure 6:
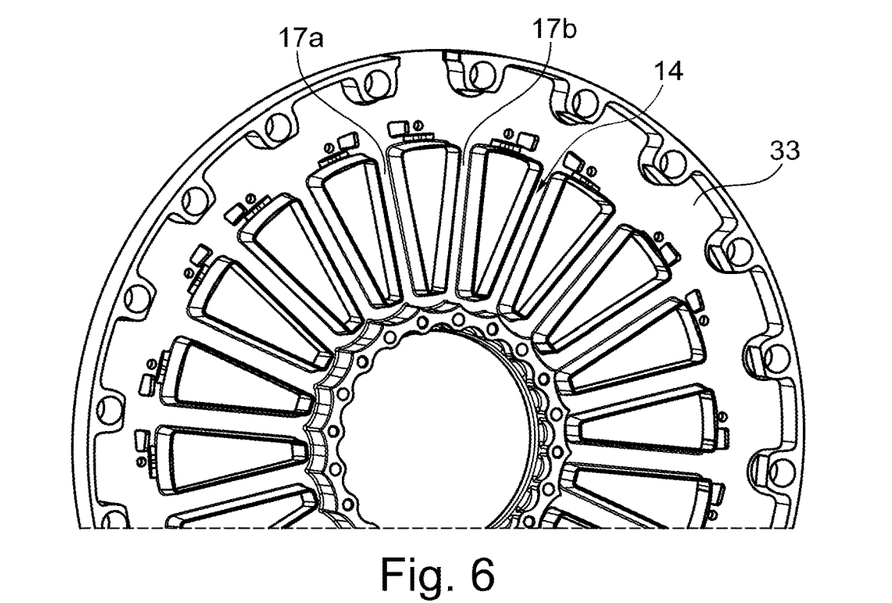
FIG. 6 shows a perspective illustration of a shell element forming the carrier wheel.
Figure 7:
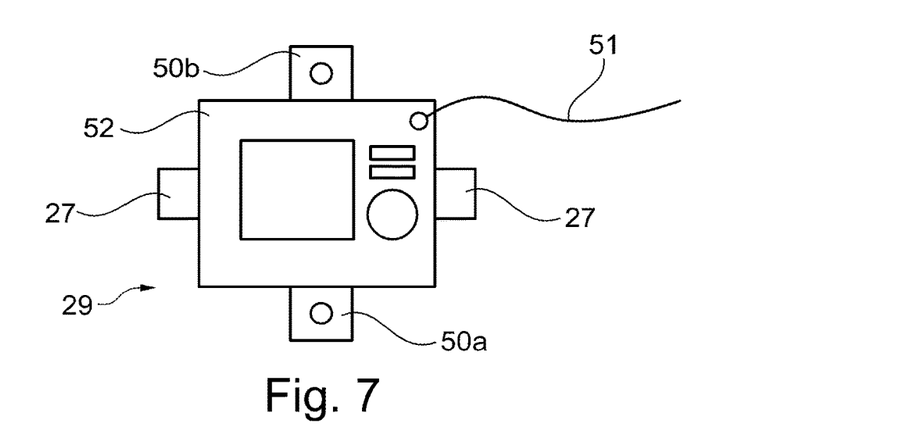
FIG. 7 shows a plan view of a power electronics unit, shown in simplified form, to be placed in the disc rotor machine according to the disclosure on several phase rings and used to control several coils.
Figure 8:
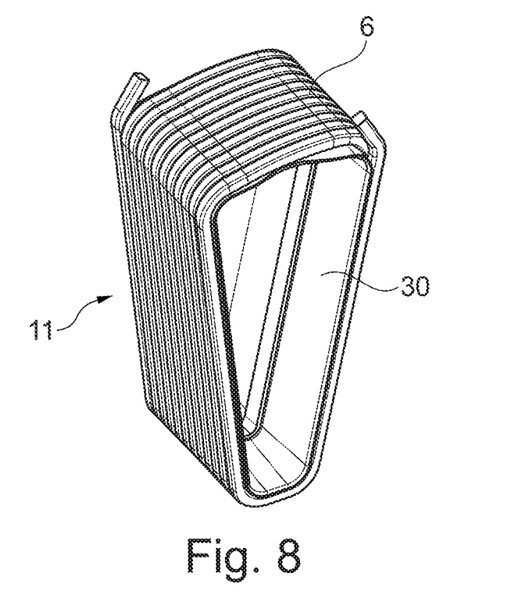
FIG. 8 shows a perspective illustration of a coil with a coil carrier and coil winding, as used in the disc rotor machine according to FIG. 1.
Figure 9:
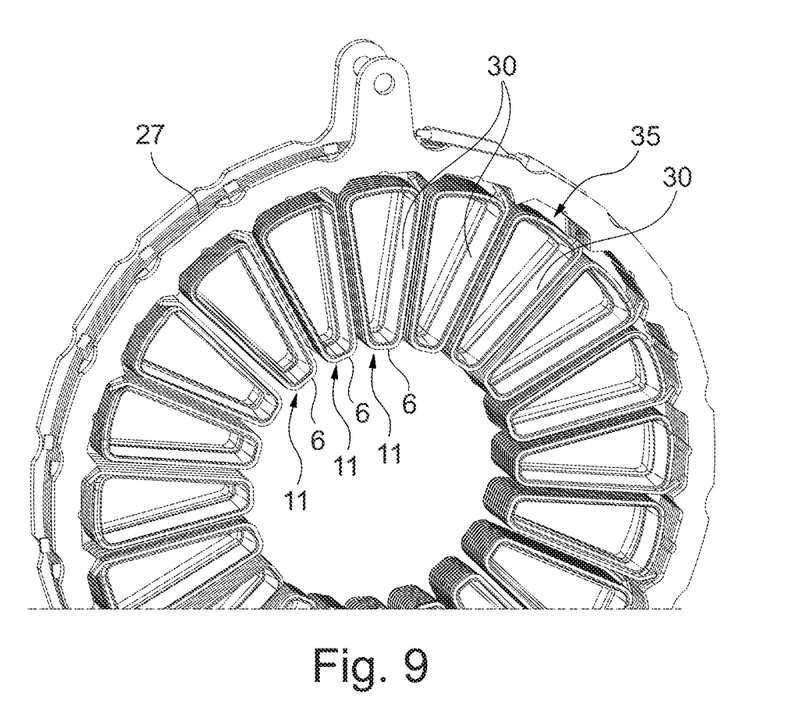
FIG. 9 shows a perspective representation of a subassembly of several coils distributed in the circumferential direction and several phase rings arranged radially outside the coils and connected to the coils.

First, the structure of the carrier wheel 13 will be discussed in more detail, which can also be seen clearly in FIG. 4. According to the disclosure, the carrier wheel 13 directly forms a plurality of cooling channel portions 14 of a cooling device 12. At the same time, the carrier wheel 13 receives a plurality of coil windings 6 of a plurality of coils 11, which are arranged distributed in the circumferential direction. In the completely assembled state of the stator 2, each coil winding 6 is consequently part of an individual coil 11. The coil windings 6 are particularly clearly visible in FIGS. 8 to 11. Each coil winding 6 is firmly received on a coil carrier 30 and is fixed together with this coil carrier 30 in the carrier wheel 13. A core segment 5 is inserted within each coil winding 6 during operation. The core segment 5 is consequently implemented as an iron core. The carrier wheel 13 is composed of two shell elements 33, 34, of which a first shell element 33 is shown as an example in FIG. 6.

Figure 10:
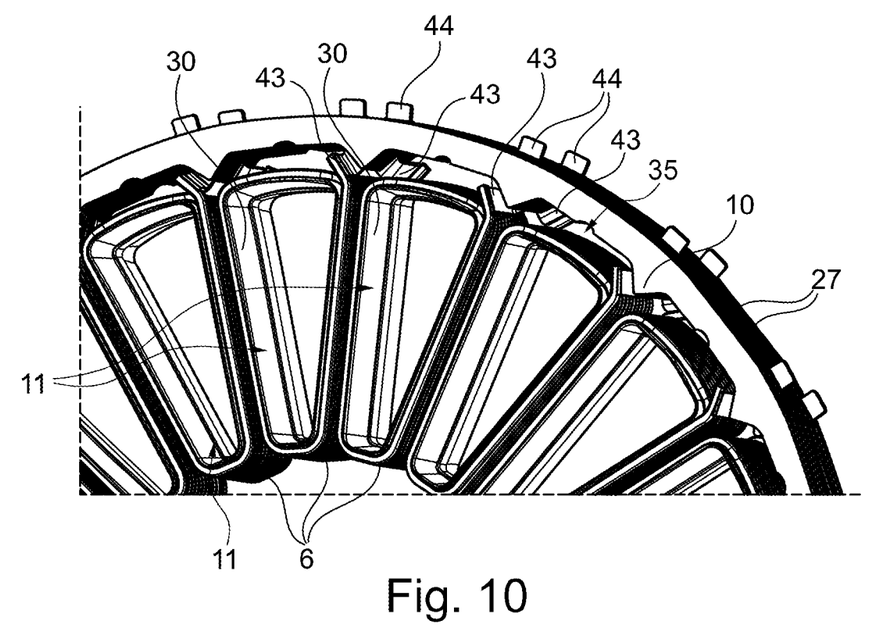
FIG. 10 shows a perspective view of part of the subassembly of FIG. 9.

Each coil winding 6 is connected to two of a large number of phase rings 27. For this purpose, each phase ring 27 has first lugs 43/tabs which project radially inward and are connected to the ends of the coil windings 6 (FIG. 10). Second lugs 44/tabs of the phase rings 27 protruding radially outward are connected to a plurality of power electronics units 29 which are arranged distributed in the circumferential direction and are attached directly to these phase rings 27. A power electronics unit 29 is shown by way of example in FIG. 7. In this embodiment, one power electronics unit 29 is present for each coil 11. The individual power electronics units 29 form an integral power electronics unit for controlling a coil arrangement 35 comprising the coils 11.

Figure 11:
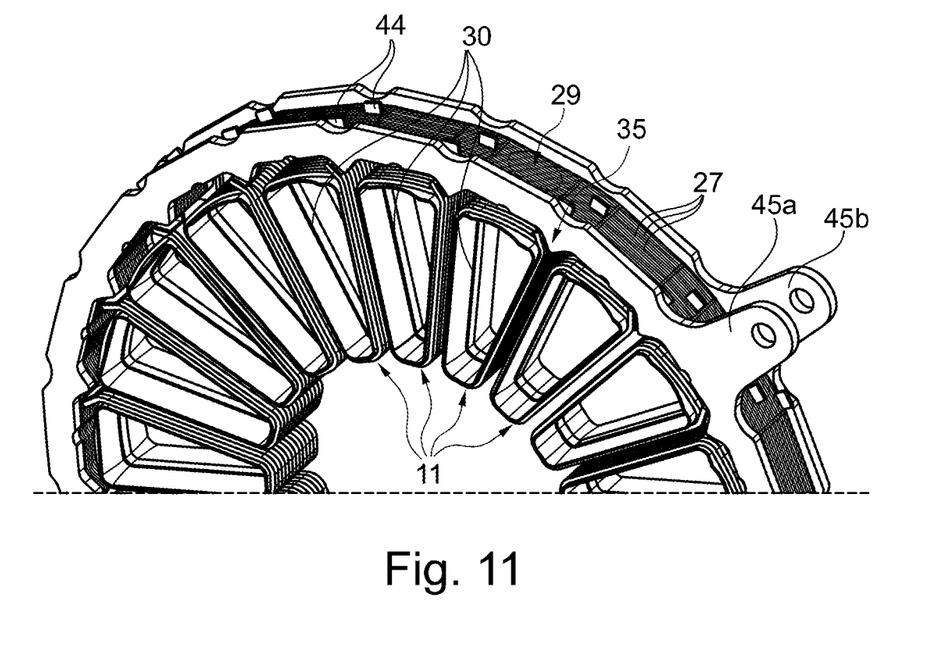
FIG. 11 shows a perspective illustration of the subassembly according to FIG. 9 towards a radial outer side, a mounting area of the power electronics unit being identified by a dashed elliptical line.

As indicated in FIG. 10 in connection with FIG. 11, an insulation 28 in the form of an insulating washer (e.g., paper seal or insulating varnish on the respective phase ring 27) is arranged between each two immediately adjacent phase rings 27, which serves to electrically decouple the immediately adjacent phase rings 27 from one another. The phase rings 27 are thus placed on top of one another to form a stack. At each end of the stack, the phase rings 27 are fixed by holding discs 45*a*, 45*b* (FIG. 11).

Figure 12:
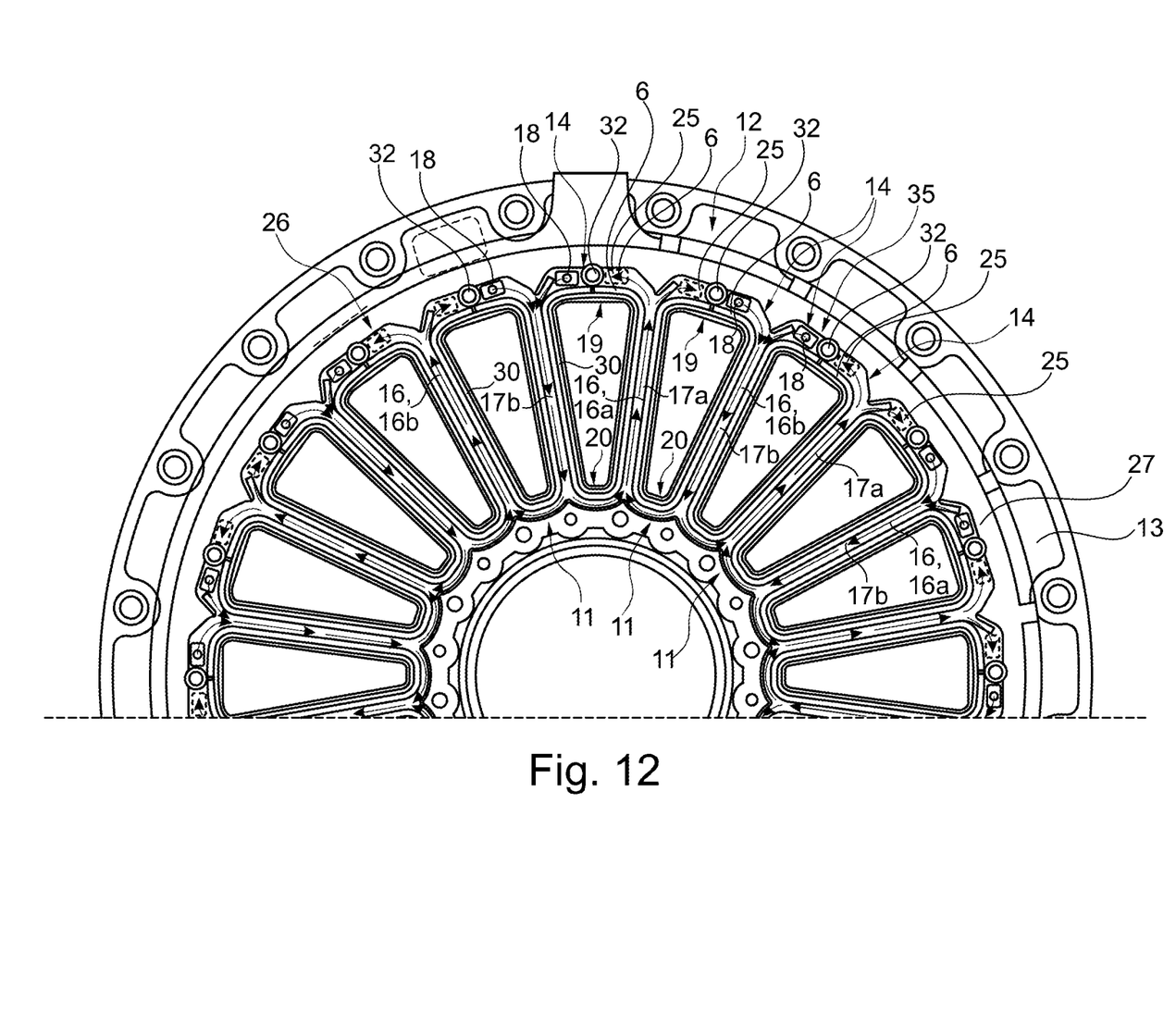
FIG. 12 shows a cross-sectional view of the carrier wheel according to FIGS. 3 and 4, whereby several cooling channel portions connected to an inlet and a return, within which the coil windings are arranged, can be seen.

According to the disclosure, as can be clearly seen in connection with FIG. 12, the cooling channel portion 14 is formed directly in the carrier wheel 13 and is guided directly past a coil winding 6 or directly receives this coil winding 6. The coil winding 6 is arranged in a partial cavity 16 formed directly by two adjacent hollow spokes 17*a*, 17*b* of the carrier wheel 13.

A partial cavity 16 extends completely circumferentially/annularly in the radial plane running perpendicular to the axis of rotation 15 in FIG. 12. In a first radially outer region 19, the partial cavity 16 is separated by a sealing element 32. An inlet 18 is connected to the cooling channel portion 14 on a first circumferential side of the sealing element 32, and a return 25 is connected to the cooling channel portion 14 on a second circumferential side of the sealing element 32 opposite the first circumferential side. The inlet 18 and return 25 are therefore located in the common (first) radial region 19.

The partial cavity 16 extends from the first radial area 19 over the two hollow spokes 17*a*, 17*b*, while receiving the corresponding sections of the coil winding 6, in the radial direction inward and transfers to a radial inner side in a second radial area 20. The two hollow spokes 17*a*, 17*b* are connected to one another in the second radial region 20 in the circumferential direction.

In this way, each coil winding 6 is received in a partial cavity 16, the immediately adjacent partial cavities 16 (highlighted in FIG. 12 by a first partial cavity 16*a* and a second partial cavity 16*b*) each also being formed by a common hollow spoke 17*a*, 17*b*. Furthermore, it should be noted that inlet 18 and return 25 are arranged alternately. Accordingly, for example, in a first partial cavity 16*a* according to FIG. 12, the cooling channel portion 14 is connected towards the first peripheral side of the sealing element 32 to the inlet 18, while a further cooling channel portion 14 is connected to the inlet 18 in a second partial cavity 16*b* to the second peripheral side of its sealing element 32. The same applies to the return lines 25, which are each connected to the cooling channel portions 14 on the other circumferential sides of the sealing element 32.

Returning to FIGS. 1 and 2, it can also be seen that an annular inlet channel 22 is implemented between the carrier wheel 13 and a first retaining ring 3, which inlet channel 22 directly forms the inlet 18 of the cooling channel portions 14. The inlet channel 22 is connected to one of the cooling channel portions 14 via a first axially extending connecting channel 21. A return channel 24 is formed directly between the carrier wheel 13 and a second retaining ring 4, which return channel 24 directly forms the return 25 of the cooling channel portions 14. The return channel 24 is connected to one of the cooling channel portions 14 via a second axially extending connecting channel 23.

Furthermore, it can be seen from FIGS. 1 and 2 that each cooling channel portion 14 is delimited directly by the phase rings 27 towards a radial outer side 26, so that the phase rings 27 are also cooled directly by the flowing coolant during operation.

In FIGS. 13 to 16b, the sub-assembly of the core segments 5 with the retaining rings 3, 4 can then be seen. The first retaining ring 3 is welded to a plurality of first retaining plates 36a, each attached to halves 49 of the core segments 5, here via a laser weld seam. The first retaining plates 36a extend, preferably curved, along an imaginary circular line of an inner circumference of the first retaining ring 3. The halves 49 of the core segments 5 per se are implemented by a base body 46 formed from sheet metal.

In addition to the first holding plate 36 attached radially from the outside to the base body 46, there is a second holding plate 36b which is attached to a radial inside of the base body 46. The second retaining plate 36b is welded to a further (third) retaining ring 47. The second holding plate 36b preferably extends bent along an imaginary circular line of an outer circumference of the third retaining ring 47.

Figure 13:
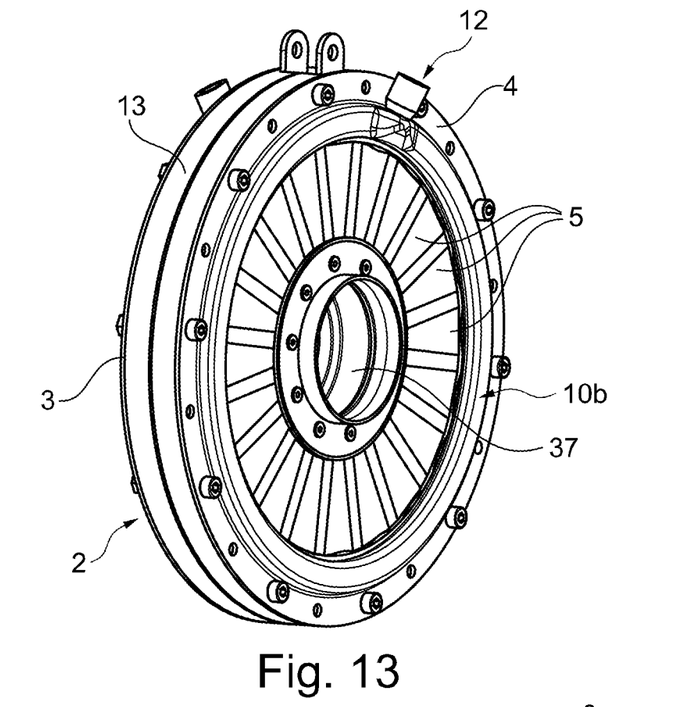
FIG. 13 shows a perspective illustration of the disc rotor machine according to the disclosure with the cover plates and rotor discs removed.
Figure 14:
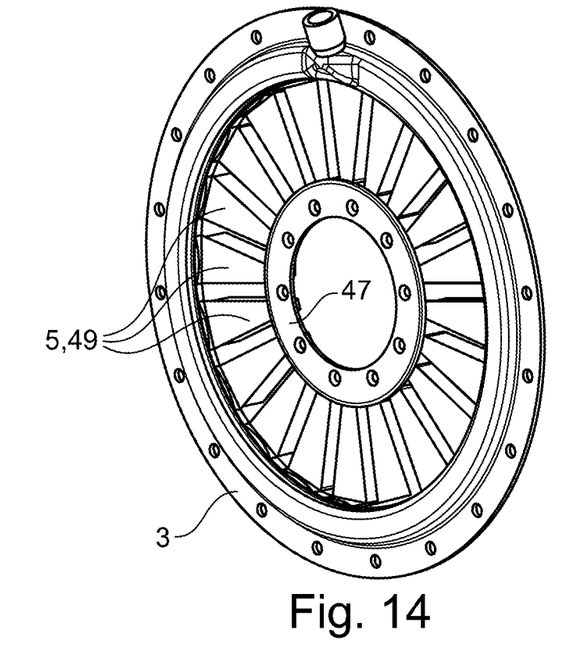
FIG. 14 shows a perspective illustration of a subassembly made up of a retaining ring with several halves of several core segments.
Figure 15:
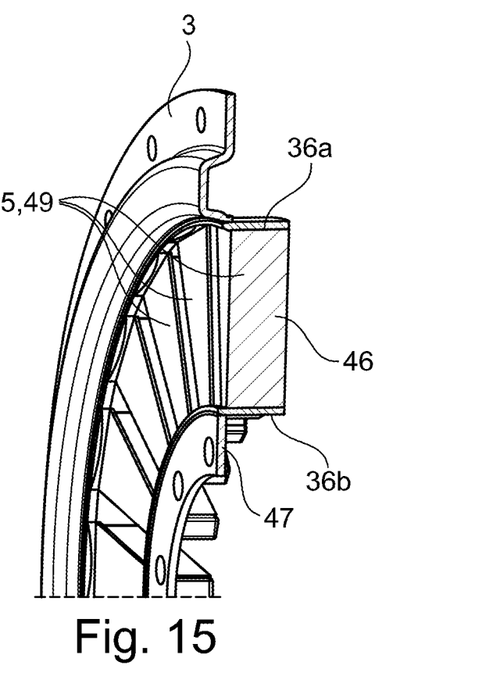
FIG. 15 shows a perspective illustration of the partial assembly according to FIG. 14, shown in a longitudinal section.
Figure 16A:
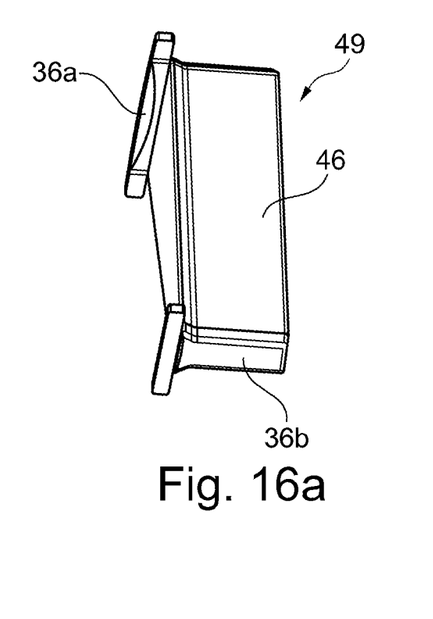
FIGS. 16a and 16b show two different perspective representations of a half of a core segment inserted in FIG. 14 with corresponding retaining plates.
Figure 16B:
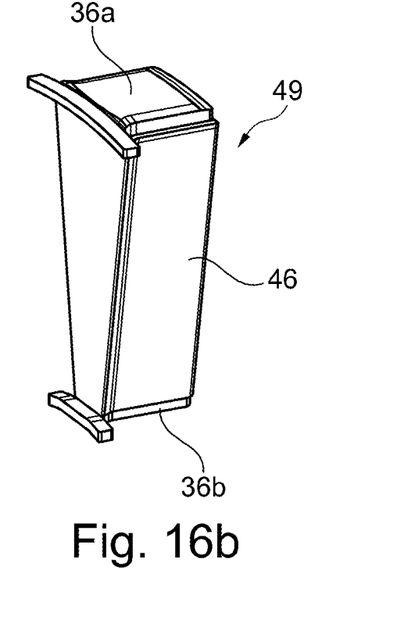
Figure 17:
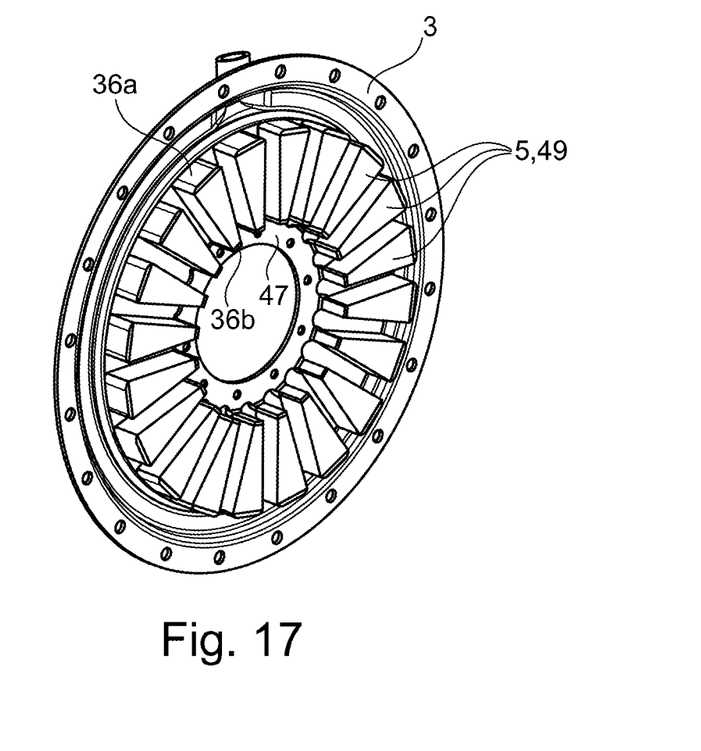
FIG. 17 shows a perspective illustration of a subassembly consisting of a retaining ring with several halves of several core segments converted in the circumferential direction according to a second exemplary embodiment, the core segments differing in structure from the first exemplary embodiment.
Figure 18:
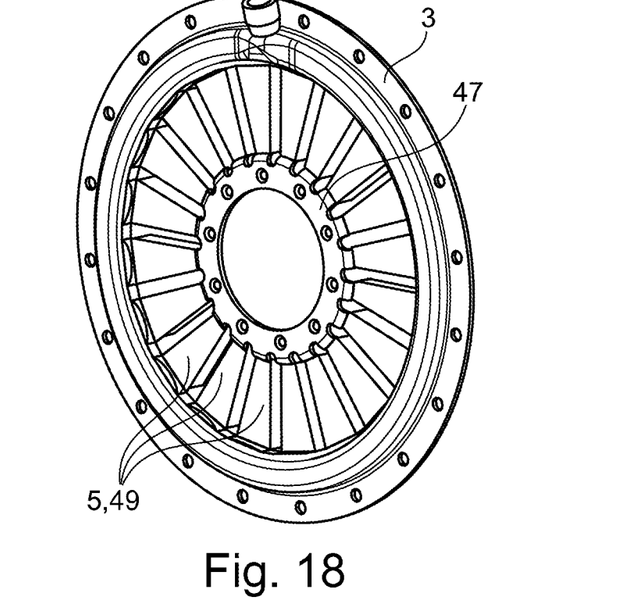
FIG. 18 shows a perspective view of the sub-assembly according to FIG. 17 from a side facing away from the side shown in FIG. 17.
Figure 19:
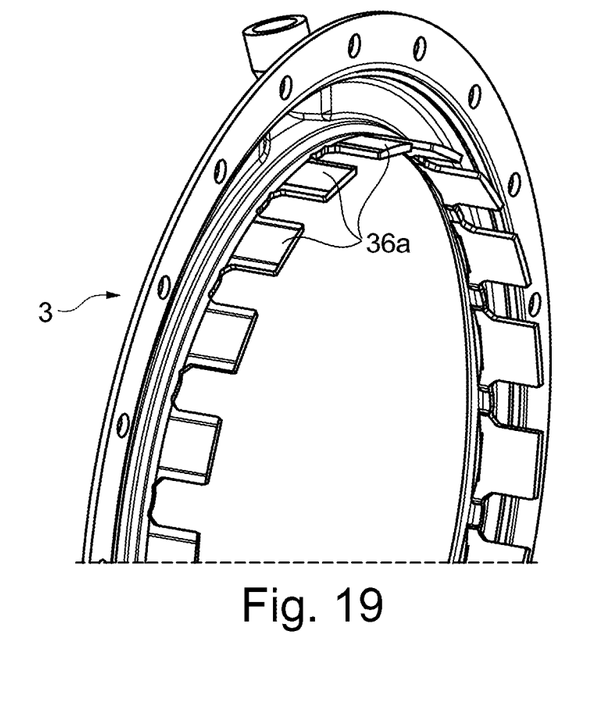
FIG. 19 shows a perspective illustration of the retaining ring used in FIG. 17.

The second retaining ring 4 with further halves 49 of the core segments 5 is also manufactured on this. After assembling the halves 49 of each core segment 5, the subassembly results, as can be seen in FIG. 13.

Figure 20:
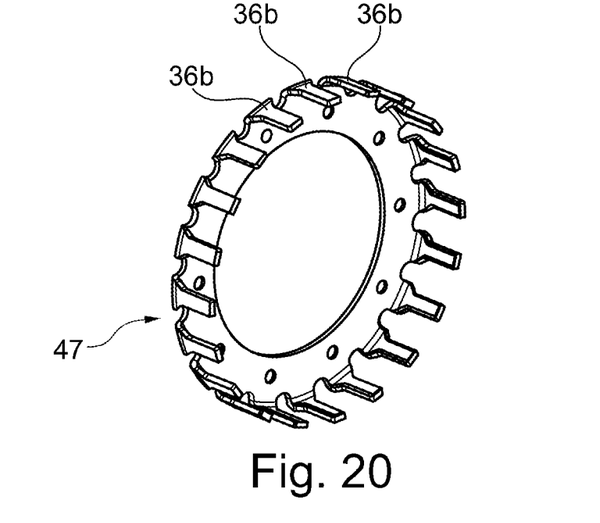
FIG. 20 shows a perspective illustration of an (inner) retaining ring also used in FIG. 17 in addition to the retaining ring according to FIG. 19.
Figure 21:
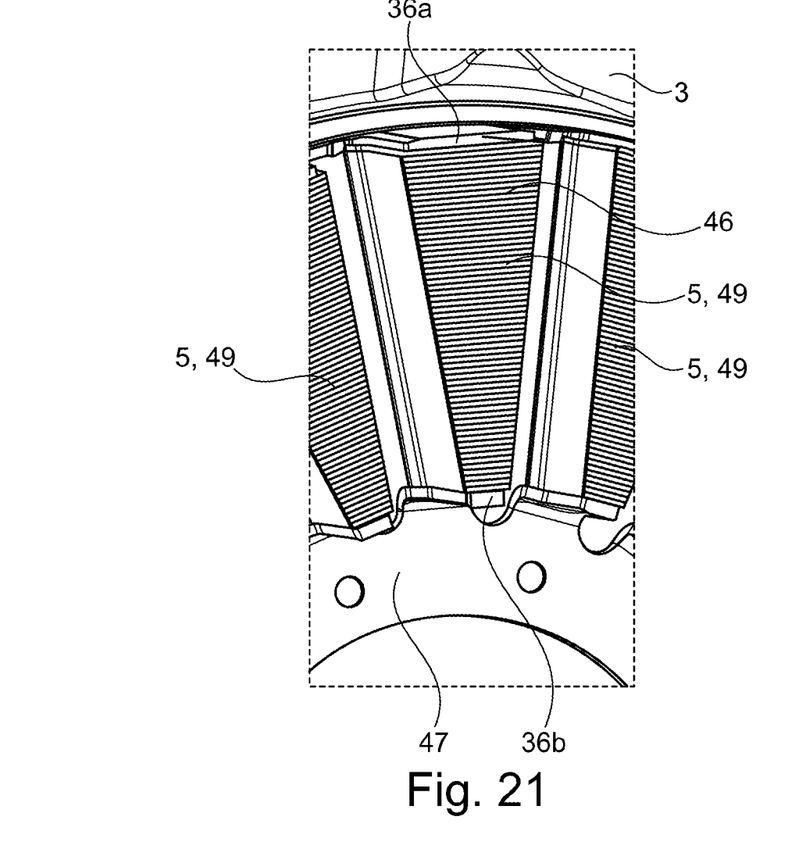
FIG. 21 shows a perspective detailed view of the subassembly according to FIG. 17 on the part of a core segment half.

In this context, reference is made to FIGS. 17 to 21, which represent an alternative embodiment to this sub-assembly. Accordingly, it is in principle also advantageous if each base body 46 is formed from a plurality of (baked) sheet metal segments stacked one above the other in the radial direction and forming a trapezoid as a whole. The sheet metal segments are preferably glued to one another and to the retaining sheets 36a, 36b. In this embodiment, the first holding plates 36a are then preferably already formed directly on the first retaining ring 3. As can be seen in FIG. 20, the respective second holding plate 36b is also formed directly on the third retaining ring 47.

Figure 27:
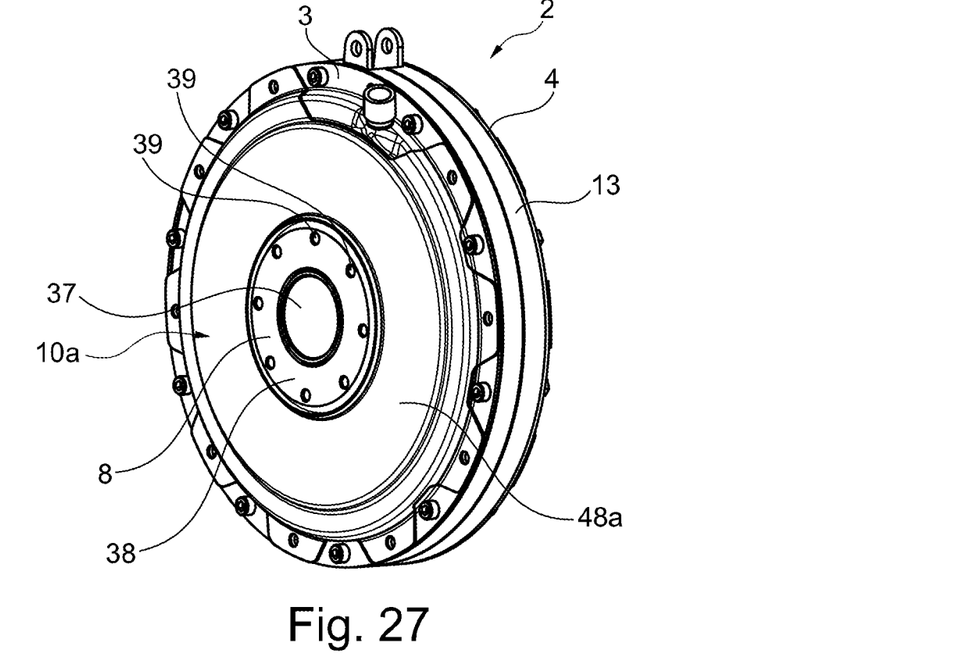
FIG. 27 shows a perspective illustration of the disc rotor machine according to FIG. 1 from a first axial side.
Figure 28:
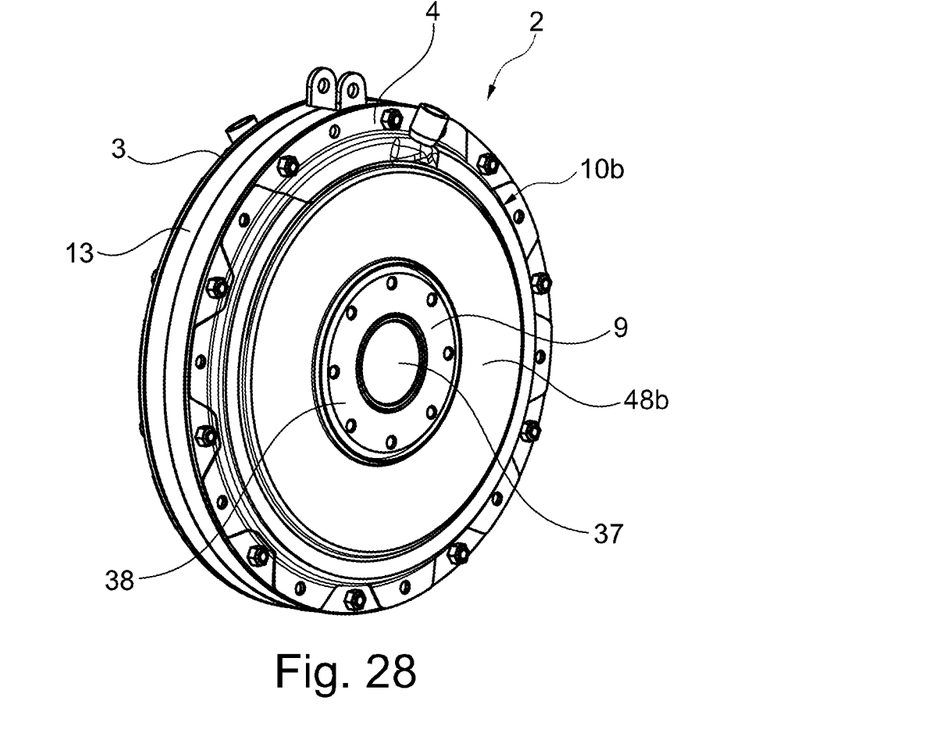
FIG. 28 shows a perspective illustration of the disc rotor machine according to FIG. 1 from a second axial side.

In FIGS. 27 and 28, the finished disc rotor machine 1 can then be clearly seen, whereby in addition, cover plates 48a, 48b running from both axial sides between the respective flange area 38 and the retaining rings 3, 4 are attached for axial covering. The retaining rings 3, 4, 47 are preferably formed from a V2A or V4A steel.

It should furthermore be noted that the sealing elements 32 used are equipped with an elastomer hose for sealing or dividing the coil space/the partial cavity 16 and for guiding the cooling flow. The elastomer hose is fixed in the carrier wheel 13 via a locking pin. In further embodiments, the seal provided by sealing elements 32 is also molded directly onto the plastic of the shell elements 33, 34 of the carrier wheel (preferably using 2K injection molding technology).

In other words, according to the disclosure, a liquid cooling 12, in which the medium hits the wires (of the coil windings 6) directly, is implemented, which means that there is a high potential for removing the heat loss. As a result, the coil wires 6 are 100% reached and cooled by means of the liquid cooling 12. This makes it possible to load the motor 1 with high currents, which results in high motor torques. A main feature of the engine design is the functional separation between torque support via sheet metal parts 3, 4 and the sealing of the cooling medium with components (carrier wheel 13) made of plastic.

The illustrated motor 1 has twenty individual coils 11, for example. It is known that at least 3 phases are required in order to be able to speak of "three-phase current". This motor 1 provides ten phases, for example. Therefore, two coils 11 (which are offset by 180°—i.e. are arranged opposite to the axis of rotation 15) are energized with the same phase. The phase rings 27 serve to supply the coils 11 with current. Each coil 11 is connected to two of the phase rings 27. Each phase ring 27 therefore has protruding connecting fingers 43, 44 for contacting. The fingers 43 protruding radially inward serve to connect to the coil wire 6, while the radially outward protruding fingers 44 are provided for connecting to the power electronics. Together, the phase rings 27 result in the phase ring package which, when combined, produces a suitable, cooled outer surface through which the power electronics are cooled.

Due to the large number of phases, the required power electronics can consist of ten smaller separate units 29. These units 29 can be placed on the outside of the phase package 27 (distributed over the circumference). Each unit 29 therefore energizes two coils 11. Each power electronics unit 29 is fed via the plus and minus poles and each connected to two phase rings 27. The units 29 are controlled by a central control electronics via a bus (line with several signal cables). Each power electronics unit 29 is additionally controlled with at least one control cable from the bus. According to the representations shown in FIG. 7, the power electronics are kept dry. In a further variant it is conceivable, however, that it is also placed on the radially inner side of the phase ring assembly 27. In this way, the coolant would wash directly around it and cool it even more efficiently. Power electronics unit 29 is shown with two battery connections (minus 50a; plus 50b), a signal cable 51, two of the phase rings 27 and a circuit board 52.

Figure 22:
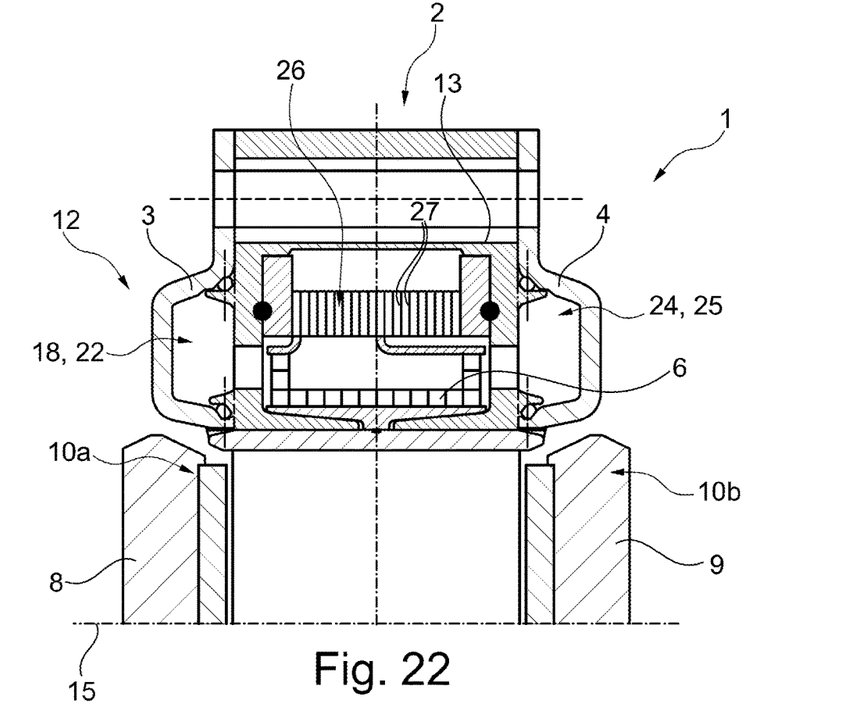
FIG. 22 shows a longitudinal sectional illustration of a disc rotor machine according to the disclosure according to a third embodiment.

FIG. 22 illustrates the structure of the motor 1 shown, which has a design of a multi-phase concept, with the advantage of being able to connect several power electronics modules 29 via the phase rings 27 and to enable a "smoother" three-phase current. Instead of the required +/− poles and the many phase rings 27, this area can also have only three conductors (phase rings 27). Depending on how the coils are connected, an additional neutral conductor—a fourth "phase ring"—may be required. Then the motor 1 is implemented as a three-phase motor with only 3 phases. The phase rings 27 have suitable angled connecting fingers 43 where they are connected to the corresponding coils 11. The two coil ends are contacted here by soldering/welding/or clamping connections. In the case of a 3-phase concept, for example, the individual conductors 27 are much more massive, so that the provision of such connecting fingers becomes unrealistic. Rather, the coil ends are then correspondingly angled to be connected to the correct phase ring 27.

LIST OF REFERENCE NUMBERS

1 Disc rotor machine
2 Stator
3 First retaining ring
4 Second retaining ring
5 Core segment
6 Coil winding
7 Rotor
8 First rotor disc
9 Second rotor disc
10a First side
10b Second side
11 Coil arrangement
12 Cooling device
13 Carrier wheel
14 Cooling channel portion
15 Axis of rotation
16 Partial cavity
16a First partial cavity 16b Second partial cavity
17A First hollow spoke
17b Second hollow spoke
18 Inlet
19 First area
20 Second area
21 First connecting channel
22 Inlet channel
23 Second connecting channel
24 Return channel
25 Return
26 Outer side
27 Phase ring
28 Insulation
29 Power electronics unit
30 Coil carrier
31 Contact contour
32 Sealing element
33 First shell element
34 Second shell element
35 Coil
36a First holding plate
36b Second holding plate
37 Coupling shaft
38 Flange region
39 Receiving hole
40 Internal toothing
41 External toothing
42 Plate
43 First lug
44 Second lug
45a First retaining disc
45b Second retaining disc
46 Base body
47 Retaining ring
48 First cover sheet
48b Second cover sheet
49 Half
50a First battery connection
50b Second battery connection
51 Signal cable
52 Circuit board

The invention claimed is:

1. A disc rotor machine for a motor vehicle drive, comprising: a disc-shaped stator, the stator having a plurality of core segments distributed in a circumferential direction and firmly connected to one another by at least one retaining ring, and a plurality of coil windings, each running around a core segment, with a rotor rotatably mounted relative to the stator, the rotor having a first rotor disc, which is arranged on a first axial side next to the stator, and a second rotor disc which is arranged on a second axial side opposite the first axial side next to the stator, wherein the rotor discs can be driven by a plurality of coils of the stator that are distributed in a circumferential direction and include the core segments and the coil windings, as well as by a cooling device which cools the coils during operation, wherein the stator has a carrier wheel which receives the coil windings and is connected to the at least one retaining ring, the carrier wheel forming a cooling channel portion of the cooling device which directly receives at least one of the coil windings, wherein the cooling channel portion is directly limited towards its radial outer side by a plurality of phase rings, which are connected respectively to the coil windings and are stacked next to one another.

2. The disc rotor machine according to claim 1, wherein two phase rings of the plurality of phase rings arranged next to one another respectively are electrically decoupled from one another by insulation provided between them.

3. The disc rotor machine according to claim 1, wherein at least one power electronics unit, which is at least partially electrically coupled with the phase rings, is arranged on the phase rings.

4. The disc rotor machine according to claim 1, wherein the cooling channel portion is directly formed by a partial cavity of the carrier wheel which receives the at least one coil winding and which is arranged in a radial plane perpendicular to a central axis of rotation.

5. The disc rotor machine according to claim 4, wherein the partial cavity is also formed by two radially extending hollow spokes of the carrier wheel that are spaced apart in the circumferential direction, which the hollow spokes are separated from one another, in the circumferential direction, in a first radial area having an inlet, and are connected to one another in the circumferential direction in a second radial area which is radially offset from the first radial area.

6. The disc rotor machine according to claim 1, wherein the cooling channel portion is connected via an axially running first connecting channel to an annular inlet channel which is enclosed between the carrier wheel and a first retaining ring of the at least one retaining ring.

7. The disc rotor machine according to claim 6, wherein the cooling channel portion is connected via an axially running second connecting channel to an annular return channel which is enclosed between the carrier wheel and a second retaining ring of the at least one retaining ring.

8. The disc rotor machine according to claim 1, wherein a coil carrier that receives a coil winding is affixed in the carrier wheel.

9. The disc rotor machine according to claim 8, wherein the coil carrier has a conical contact contour which is received in the carrier wheel.

* * * * *